United States Patent [19]

Jan et al.

[11] Patent Number: 5,625,868
[45] Date of Patent: Apr. 29, 1997

[54] METHOD AND APPARATUS FOR LOAD SHARING IN A SATELLITE COMMUNICATION SYSTEM

[75] Inventors: Yih G. Jan; Kenneth M. Peterson, both of Phoenix, Ariz.

[73] Assignee: Motorola, Inc., Schaumburg, Ill.

[21] Appl. No.: 553,083

[22] Filed: Nov. 3, 1995

Related U.S. Application Data

[63] Continuation of Ser. No. 220,423, Mar. 30, 1994, abandoned.

[51] Int. Cl.$^6$ .................................................. H04B 7/185
[52] U.S. Cl. ........................ 455/13.4; 455/13.2; 342/352
[58] Field of Search ........................... 455/12.1, 13.1, 455/13.2–13.4, 33.1, 33.2, 54.1, 62, 38.3, 343; 342/350, 352, 354–355, 358, 360; 379/58, 59, 63

[56] References Cited

U.S. PATENT DOCUMENTS

| | | |
|---|---|---|
| 4,670,899 | 6/1987 | Brody et al. . |
| 5,227,802 | 7/1993 | Pullman et al. . |
| 5,268,694 | 12/1993 | Jan et al. . |
| 5,285,208 | 2/1994 | Bertiger et al. ........................ 455/13.4 |

OTHER PUBLICATIONS

Pickthall, Ellen "Special Issue on Mobile Satellite Communications" Modern Science and Technology of Telecommunications (Monthly) Nov., 1991 (Consecutive No. 142).

*Primary Examiner*—Andrew Faile
*Attorney, Agent, or Firm*—Gregory J. Gorrie

[57] ABSTRACT

In a satellite cellular communication system, subscriber traffic is shared between satellites whose antenna coverage patterns overlap during some portion of their orbit. When the power consumption of one satellite exceeds a predetermined level, subscriber units are transferred to cells of a second satellite whose antenna coverage pattern overlaps that of the first satellite. After the subscriber units are transferred, channel assignments are redone to prevent interference with subscriber units in other cells.

11 Claims, 12 Drawing Sheets

METHOD AND APPARATUS FOR LOAD SHARING IN A SATELLITE COMMUNICATION SYSTEM

This application is a continuation of prior application Ser. No. 08/220,423, filed Mar. 30, 1994 abandoned.

FIELD OF THE INVENTION

The present invention relates generally to communication systems that divide an area within which communications are to take place into cells and allocates spectral resources among subscriber units in the cells. The present invention more specifically pertains to communication systems having multiple satellites moving relative to each other and project cells on the surface of the Earth.

BACKGROUND OF THE INVENTION

Satellites are important links for communication between stations at different locations throughout the world, particularly for mobile communication stations. For a satellite system to give worldwide coverage, a network or constellation of satellites is desirable.

Each satellite within such a satellite constellation has one or more directional antennas producing a coverage pattern on Earth referred to as the "footprint" of the satellite antenna. When multiple polar orbiting satellites are used, the satellites converge towards the poles and antenna footprints begin to overlap.

Where the antenna footprint is made up of separate "cells" in which individual communication is to take place, certain cells overlap. When cells from one satellite overlap cells from another satellite, the cells may be turned off as part of a cell management plan to prevent interference between cells of the same channels.

Individual satellites generally have limited energy resources. Typical energy resources aboard a satellite include batteries and solar cells to supply the power for satellite maintenance and communications. In a satellite communication system, the number of subscriber units in a particular geographic region requiring communication services may exceed the energy available to the satellite at that time. For example, this may occur in a satellite communication system where the satellites move with respect to the surface of the Earth when an individual satellite may, during some portion of its orbit, pass over high population density areas such as Europe, Japan or India where there is a high demand for communication services. The satellite may not have enough energy to provide communication services over these regions during peak hours. Furthermore, when the same satellite passes over several areas having high demand for communication services during its orbit, or passes over the same high demand area each orbit, the problem is worsened because the satellite may not be able to recharge its energy supply.

Thus what is needed is a method and apparatus for sharing the load created by high demand areas among other satellites in the communication system. What is further needed is a method and apparatus of transferring subscriber units from overloaded satellites to satellites not experiencing overload. What is further needed is a method and apparatus for distributing power loading move evenly among satellites in a satellite communication system.

SUMMARY OF THE INVENTION

Accordingly, it is an advantage of the present invention that a communication network is provided which distributes loading among nodes of the network.

Another advantage of the present invention is that network resources dedicated to distributing power loading are minimized.

Another advantage of the present invention is that communication traffic is shared with neighboring satellites.

Another advantage of the present invention is that high demand areas and times are predicted and the load is distributed over neighboring satellites.

Another advantage is that the present invention in a preferred embodiment, compensates in real time for high demand of a particular satellite.

The above and other advantages of the present invention are carried out in one form by a method of distributing traffic load in a node cellular communication system involving two or more nodes whose antenna patterns overlap during some portion of an orbit of at least one of the nodes. The method comprises the step of monitoring a power consumption level of a first node having a first antenna coverage pattern. The method also comprises the step of determining a second node having a second antenna coverage pattern, said second antenna coverage pattern at least partially overlapping said first antenna coverage pattern creating an overlap region, said first and second antenna coverage patterns moving over the surface of the Earth and relative to each other, said first and second antenna coverage patterns servicing, except for said overlap region, different geographic regions. The method further comprises the step of transferring subscriber units located in said overlap region from cells of said first antenna coverage pattern to said cells of said second antenna pattern.

In a preferred embodiment, the method includes turning on cells associated with said second antenna coverage pattern in said overlap region when said power consumption level exceeds a predetermined value, said cells previously being turned off as said second antenna coverable pattern overlaps said first antenna coverage pattern as part of a cell management process.

Also provided by the present invention is a communication system that dynamically distributes traffic load among neighboring nodes. The system comprises a first node having a first antenna coverage pattern and a first set of cells associated therewith, a second node having a second antenna coverage pattern and a second set of cells associated therewith, said second antenna coverage pattern partially overlapping said first antenna coverage pattern creating an overlap region, said overlap region changing as relative positions of said first and second nodes change, said first and second antenna coverage patterns servicing, except for said overlap region, different geographic regions; and a control facility. The control facility monitors a power consumption level of said first satellite. The control facility also turns on cells in said overlap region when said power consumption level exceeds a predetermined value. The control facility also transfers subscriber units located in said overlap region from cells of said first antenna coverage pattern to said cells of said second antenna pattern.

DETAILED DESCRIPTION OF THE DRAWINGS

While the method and apparatus of the present invention are described for a constellation of low Earth orbiting satellites, this is merely for convenience of explanation and not intended to be limiting. The present invention applies to any system having at least two relatively moving satellites whose antenna footprints have varying overlap. Both satellites may be moving or one may be moving and the other geostationary.

A "satellite" is defined herein to mean a man-made object or vehicle intended to orbit a celestial body (e.g., Earth). A "constellation" is defined herein to mean an ensemble of satellites arranged in orbits for providing specified coverage (e.g., radio communication, photogrammetry, etc.) of portion(s) or all of the celestial body. A constellation typically includes multiple rings (or planes) of satellites and may have equal numbers of satellites in each plane, although this is not essential. As used herein the terms "cell" and "antenna pattern" are not intended to be limited to any particular mode of generation and include those created by either terrestrial or satellite cellular communications systems and/or combinations thereof.

Figure 1:
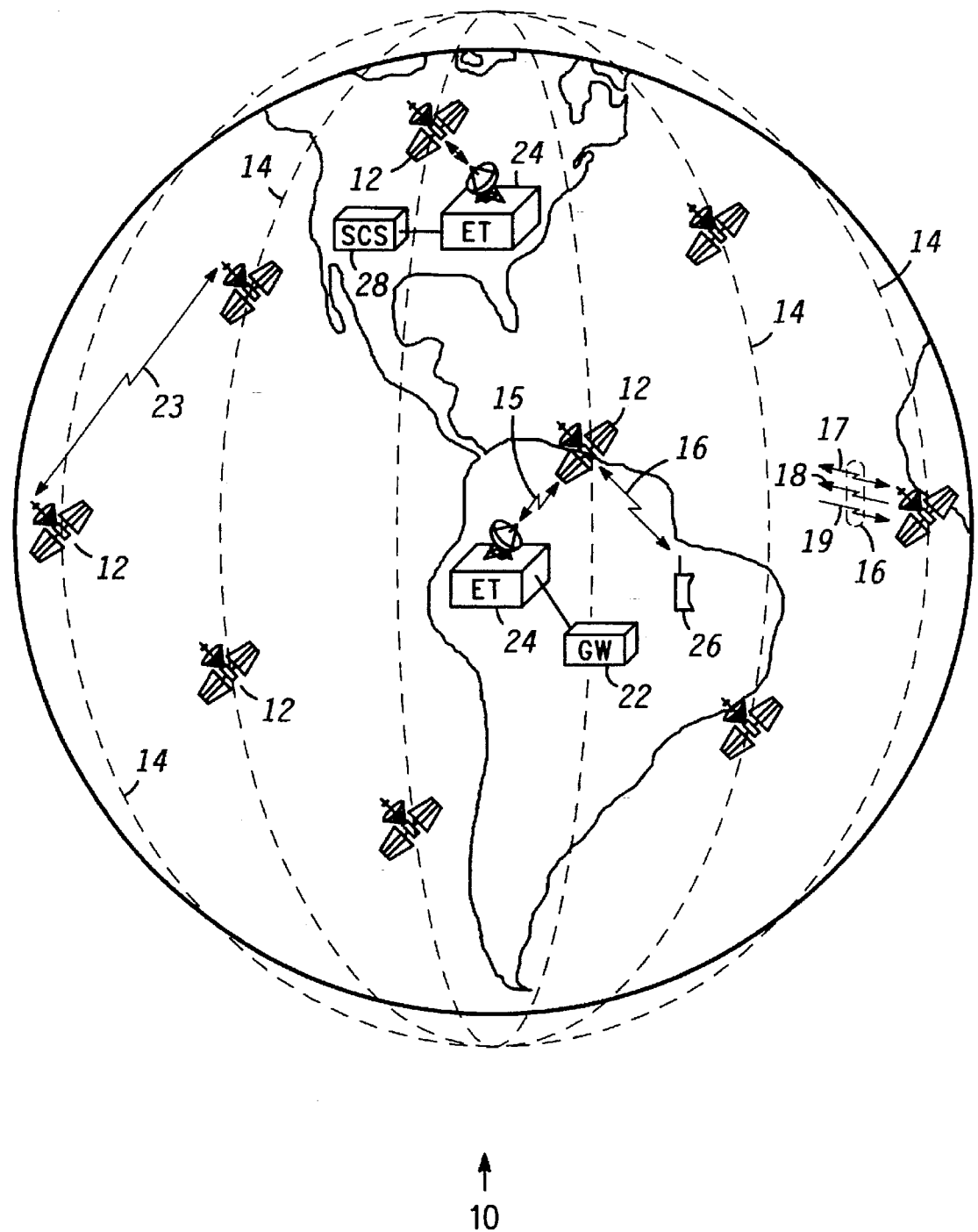
FIG. 1 shows a layout diagram of an environment which supports a cellular communications system within which the present invention may be practiced.

FIG. 1 shows a layout diagram of an environment within which a radio telecommunications system 10 operates. Communication system 10 is dispersed over and surrounding a celestial body (e.g., Earth) through use of orbiting satellites 12 occupying orbits 14. The present invention is applicable to systems including satellites having low-Earth, medium-Earth and geo-synchronous orbits. Additionally, it is applicable to orbits having any angle of inclination (e.g., polar, equatorial or other orbital pattern).

Exemplary communication system 10 uses six polar orbits 14, with each orbit 14 holding eleven satellites 12 for a total of sixty-six satellites 12. However, this is not essential and more or fewer satellites, or more or fewer orbits, may be used. While the present invention is advantageously employed when a large number of satellites are being used, it is also applicable with as few as a single satellite. For clarity, FIG. 1 illustrates only a few of the satellites in the constellation.

For example, each orbit 14 encircles Earth at an altitude of around 780 km, although higher or lower orbital altitudes may be usefully employed. Due to the relatively low orbits of satellites 12, substantially line-of-sight electromagnetic (e.g., radio, light etc.) transmission from any one satellite or reception of signals by any one satellite involves or covers a relatively small area of Earth at any instant.

For the example shown, satellites 12 travel with respect to Earth at around 25,000 km/hr, allowing satellite 12 to be visible to a terrestrial station for a maximum period of approximately nine minutes.

Satellites 12 communicate with terrestrial stations which may include some number of radio communication subscriber units (SUs) 26 and Earth terminals (ETs) 24 connected to system control segment (SCS) 28. ETs 24 may also be connected to gateways (GWs) 22, which provide access to the public switched telephone network (PSTN) or other communications facilities. Only one each of GWs 22, SCS 28 and SUs 26 are shown in FIG. 1 for clarity and ease of understanding. ETs 24 may be co-located with or separate from SCS 28 or GW 22. ETs 24 associated with SCSs 28 receive data describing tracking of satellites 12 and relay packets of control information while ETs 24 associated with GWs 22 only relay data packets (e.g., relating to calls in progress).

SUs 26 may be located anywhere on the surface of the Earth or in the atmosphere above the Earth. SUs 26 are preferably communications devices capable of transmitting data to and receiving data from satellites 12. By way of example, SUs 26 may be a hand-held, portable cellular telephones adapted to communicate with satellites 12. Ordinarily, SUs 26 need not perform any control functions for communication system 10.

Communication system 10 may accommodate any number, potentially in the millions, of subscriber units 26. In the preferred embodiments of the present invention, subscriber units 26 communicate with nearby satellites 12 via subscriber links 16. Links 16 encompass a limited portion of the electromagnetic spectrum that is divided into numerous channels. Links 16 are preferably combinations of L-Band frequency channels and may encompass Frequency Division Multiple Access (FDMA) and/or Time Division Multiple Access (TDMA) communications or combination thereof. As a minimum, a satellite 12 continuously transmits over one or more broadcast channels 18. Subscriber units 26 synchronize to broadcast channels 18 and monitor broadcast channels 18 to detect data messages which may be addressed to them. Subscriber units 26 may transmit messages to satellites 12 over one or more acquisition channels 19. Broadcast channels 18 and acquisition channels 19 are not dedicated to any one subscriber unit 26 but are shared by all subscriber units 26 currently within view of satellite 12.

On the other hand, traffic channels 17 are two-way channels that are assigned to particular subscriber units 26 by satellites 12 from time to time. In the preferred embodiments of the present invention, a digital format is used to communicate data over channels 17–19, and traffic channels 17 support real-time communications. At least one traffic channel 17 is assigned for each call, and each traffic channel 17 has sufficient bandwidth to support, as a minimum, a two-way voice conversation. To support communications over channels 17–19, a time division multiple access (TDMA) scheme is desirably used to divide time into frames, preferably in the 60–90 millisecond range. Particular traffic channels 17 are assigned particular transmit and receive time-slots, preferably having durations in the 3–10 millisecond range, within each frame. Analog audio signals are digitized so that an entire frame's signal is transmitted or received in a single short high speed burst during an allotted time-slot. Preferably, each satellite 12 supports up to a thousand or more traffic channels 17 so that each satellite 12 can simultaneously service a like number of independent calls.

Satellites 12 communicate with other nearby satellites 12 through cross links 23. Thus, a communication from subscriber unit 26 located at any point on or near the surface of the Earth may be routed through the constellation of satellites 12 to within range of substantially any other point on the surface of the Earth. A communication may be routed down to a subscriber unit 26 on or near the surface of the Earth from a satellite 12 using subscriber link 16. Alternatively, a communication may be routed down to or up from any of many ETs 24, of which FIG. 1 shows only two, through Earth links 15. ETs 24 are preferably distributed over the surface of the Earth in accordance with geopolitical boundaries. In the preferred embodiments, each satellite 12 may communicate with four ETs 24 and over a thousand subscriber units 26 at any given instant.

In general terms, system 10 may be viewed as a network of nodes. Each satellite 12, GW 22, and SU 26 represents a node of system 10. All nodes of system 10 are or may be in data communication with other nodes of system 10 through communication links 15, 16, and/or 23. In addition, all nodes of system 10 are or may be in data communication with other telephonic devices dispersed throughout the world through PSTNs and/or conventional terrestrial cellular telephone devices coupled to the PSTN through conventional terrestrial base stations.

SCS 28 monitors the health and status of system communication nodes (e.g., GWs 22, ETs 24 and satellites 12) and desirably manages operations of communication system 10. One or more ETs 24 provide the primary communications interface between SCS 28 and satellites 12. ETs 24 include antennas and RF transceivers and preferably perform telemetry, tracking and control functions for the constellation of satellites 12.

GWs 22 may perform call processing functions in conjunction with satellites 12 or GWs 22 may exclusively handle call processing and allocation of call handling capacity within communication system 10. Diverse terrestrial-based communications systems, such as the PSTN, may access communication system 10 through GWs 22.

At least one of satellites 12 is within view of each point on Earth's surface at all times (i.e., full coverage of the Earth's surface is obtained). Theoretically, any satellite 12 may be in direct or indirect data communication with any SU 26 or ET 24 at any time by routing data through the constellation of satellites 12. Accordingly, communication system 10 may establish a communication path for relaying data through the constellation of satellites 12 between any two SUs 26, between SCS 28 and GW 22, between any two GWs 22 or between SU 26 and GW 22.

The present invention is also applicable to constellations where full coverage of the Earth is not achieved (i.e., where there are "holes" in the communications coverage provided by the constellation) and constellations where plural coverage of portions of Earth occur (i.e., more than one satellite is in view of a point on the Earth's surface).

With respect to one another, satellites 12 remain relatively stationary, except for orbits 14 converging and crossing over or intersecting each other, perhaps in the polar regions as shown in FIG. 1. Due to this movement, the distances between satellites 12 that reside in adjacent orbits 14 vary with the latitudes of the satellites 12. The greatest distance between satellites 12 placed in adjacent orbits 14 exists at the equator. This distance decreases as adjacent-plane satellites 12 approach the polar regions and increases as adjacent-plane satellites 12 approach the equator.

Figure 2:
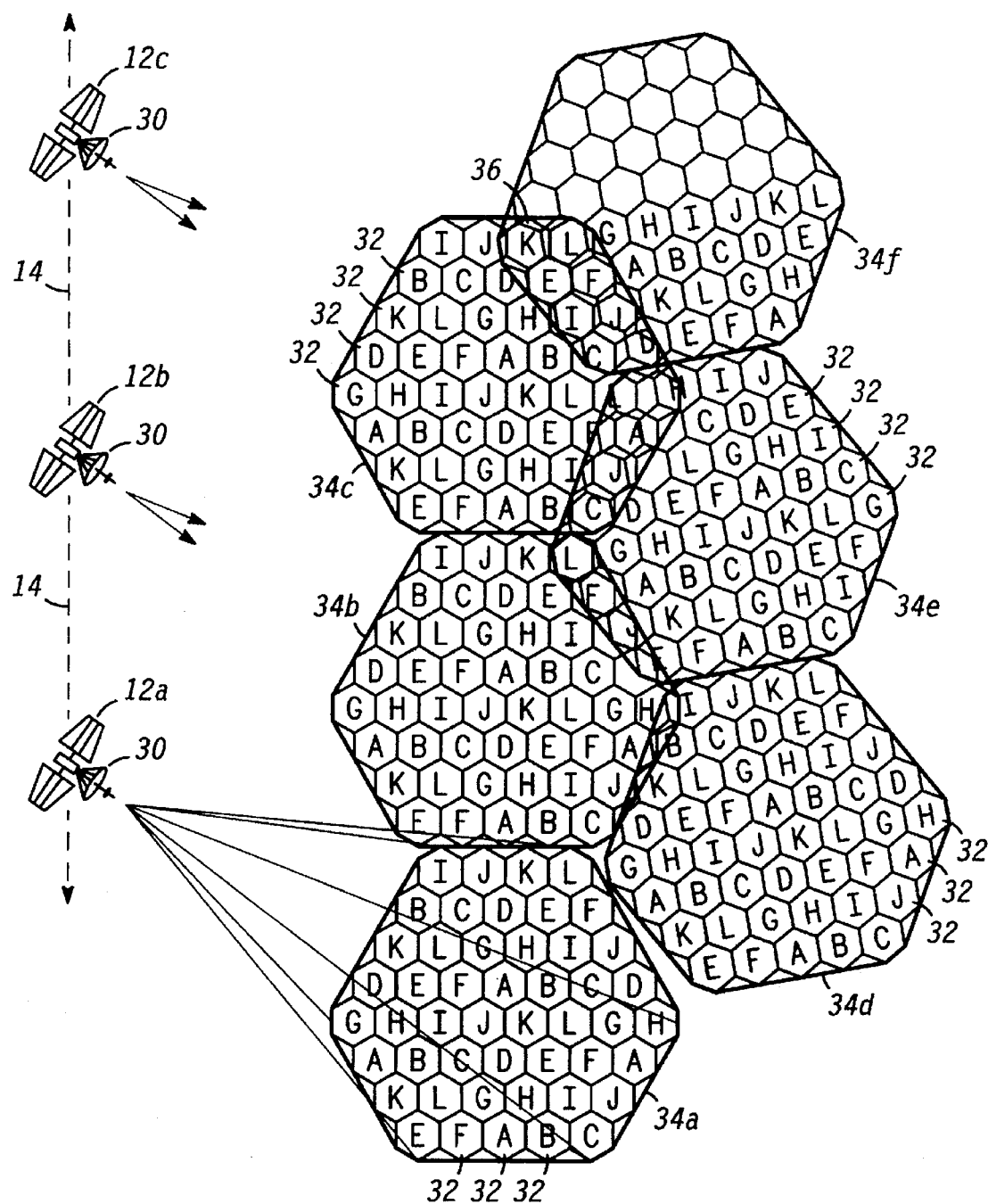
FIG. 2 graphically depicts relative orientations between footprints of satellites which may be generated by the system.

FIG. 2 graphically depicts relative orientations between footprints of satellites which may be generated by the system. FIG. 2 shows the antenna layout patterns achieved by six of satellites 12, wherein three of the six satellites 12 (satellites 12a, 12b and 12c) are sequentially positioned in one orbit 14 of the constellation (see FIG. 1) and another three of the six satellites 12 are sequentially positioned in an adjacent orbit (not shown) of the constellation. For clarity, FIG. 2 depicts only the first three of these six satellites 12 (satellites 12a, 12b and 12c).

Each satellite 12 includes an array 30 of directional antennas. Each antenna array 30 projects numerous discrete antenna patterns or beams 32 toward the Earth's surface at numerous diverse angles. FIG. 2 shows a schematic diagram of a resulting pattern of beams 32 that satellites 12 collectively form on the surface of the Earth. The pattern of beams 32 which a single satellite 12 projects on the Earth's surface is referred to as a footprint 34. FIG. 2 depicts footprints 34, each having forty-eight beams 32. However, the precise number of beams 32 included in a footprint 34 is unimportant for the purposes of the present invention. The pattern formed on the Earth by an individual antenna beam is often referred to as a "cell". Thus, the antenna pattern footprint is described as being made up of multiple cells 32. Where footprints 34 are formed by satellites 12 in system 10 (FIG. 1), footprints may be as large as 500 miles across.

FIG. 2 shows footprint 34a formed by satellite 12a, footprint 34b formed by satellite 12b, footprint 34c formed by satellite 12c, footprint 34d formed by satellite 12d (not shown), footprint 34e formed by satellite 12e (not shown), and footprint 34f formed by satellite 12f (not shown).

For convenience, FIG. 2 illustrates cells 32 and footprint 34 as being discrete, generally hexagonal shapes without overlap or gaps. However, those skilled in the art will understand that equal strength lines projected from the antennas of satellites 12 may actually have a shape far different than a hexagonal shape, that antenna side lobes may distort the pattern, that some cells 32 may cover larger areas than other cells 32, and that some overlap between adjacent cells may be expected.

Constellation of satellites 12 communicates with all SUs 26 (see FIG. 1) and ETs 24 using a limited amount of the electromagnetic spectrum. With respect to the portion of the spectrum allocated to communicating with SUs 26, the present invention divides both this spectrum and time into discrete portions, hereinafter referred to as "reuse units". Reuse units may be generally viewed as a set of communication channels. Satellites 12 transmit/receive signals to/from active cells 32 using sets of reuse units assigned to the respective active cells 32. In the preferred embodiments of the present invention, this spectrum is divided into discrete time slots and discrete frequency bands. Desirably, each reuse unit set is orthogonal to all other reuse unit sets. In other words, simultaneous communications may take place at a common location over every reuse unit of every reuse unit set without significant interference. As in conventional cellular communication systems, the reuse unit sets or communication channels are assigned to cells 32 through a reuse scheme which prevents adjacent cells 32 from using the same reuse units. However, common reuse units are reused in cells 32 which are spaced apart to efficiently utilize the allocated spectrum.

The precise number of reuse unit sets into which the spectrum is divided is not important to the present invention. FIG. 2 illustrates an assignment of twelve discrete reuse unit sets to active cells 32. FIG. 2 references the twelve discrete reuse unit sets through the use of the characters "A", "B", "C", "D", "E", "F", "G", "H", "I", "J", "K", and "L". Those skilled in the art will appreciate that a different number of reuse unit sets may be used and that, when a different number is used, the resulting assignment pattern of reuse unit sets to active cells 32 will differ from the assignment pattern depicted in FIG. 2. Likewise, those skilled in the art will appreciate that each reuse unit set may include one reuse unit or any number of orthogonal reuse units therein, and that nothing requires different reuse unit sets to include the same number of reuse units therein.

While the specific communication technique (i.e. method of allocating the communication resource) is not important for the present invention, those of skill in the art will understand that any one or combination of the above described communication techniques can be used in the present invention.

When orbits 14 cause satellites 12 to remain within view for a predetermined time (e.g., around nine minutes), as discussed above, footprints 34 likewise move over given points on the surface of the Earth in about the same time. Due to the movement of footprints 34, system 10 may expect to handoff an extensive number of calls for which communications are being exchanged between SUs 26 and satellites 12. The handoffs will transfer communications from one cell 32 to another cell 32 by changing reuse unit assignments used by the call. The receiving cell 32 may or may not reside in the same footprint 34 as the handing off cell 32. The average call will experience at least one and quite possibly many more handoffs.

FIG. 2 further illustrates overlap region 36 which results from the above-discussed convergence of orbits 14. The size of overlap region 36 varies in response to the location of the overlapping footprints 34. As can be determined by reference to FIGS. 1 and 2, the greatest amount of overlap region 36 occurs in the polar regions of the Earth, while little or no overlap occurs in the equatorial regions of the Earth. FIG. 2 represents a static snap-shot of footprints 34. The portion of overlap region 36 which is associated with any two adjacent-plane footprints 34 changes as satellites 12 move within orbits 14.

System 10 defines each cell 32 generated from the operation of the constellation of satellites 12 as being either active or inactive. Active cells 32 may be viewed as being turned "on" while inactive cells may be viewed as being turned "off" or shut down. Inactive cells 32 reside in overlap region 36, and cells 32 are switched between active and inactive states as satellites 12 orbit the Earth. Satellites 12 refrain from broadcasting transmissions within inactive cells 32, and any signals received at satellites 12 from inactive cells 32 are ignored. Only a portion of cells 32 in overlap region 36 are shut down. Some of cells 32 in overlap region 36 remain active to provide coverage in that region.

The procedures used by system 10 to determine how, when, and where to handoff calls and to determine when and how to switch cells 32 between active and inactive status and which cells 32 require switching are beyond the scope of and not relevant to the present invention. An example of cell management in satellite communication systems is discussed in U.S. Pat. No. 5,227,802 titled "Satellite System Cell Management", and is assigned to the same assignee as the present invention and incorporated herein by reference. However, when handoffs and cell status switching occurs, control communications are routed to the effected SUs 26. The SUs 26 respond to these control communications by re-tuning their transmitters and receivers to new reuse units as instructed by the control communications. These control communications may occur during ongoing calls. The cell management system turns various cells 32 on/off so as to maintain an "in contact but not greatly overlapping" condition as satellites 12 approach and depart the poles.

As used herein in reference to satellite antenna patterns, references to turning cells 32 on or off are intended to include such alternative means of locally affecting antenna sensitivity or pattern so as to avoid interference or uncertainty of satellite selection by a ground station or subscriber unit 26 (FIG. 1).

Figure 3:
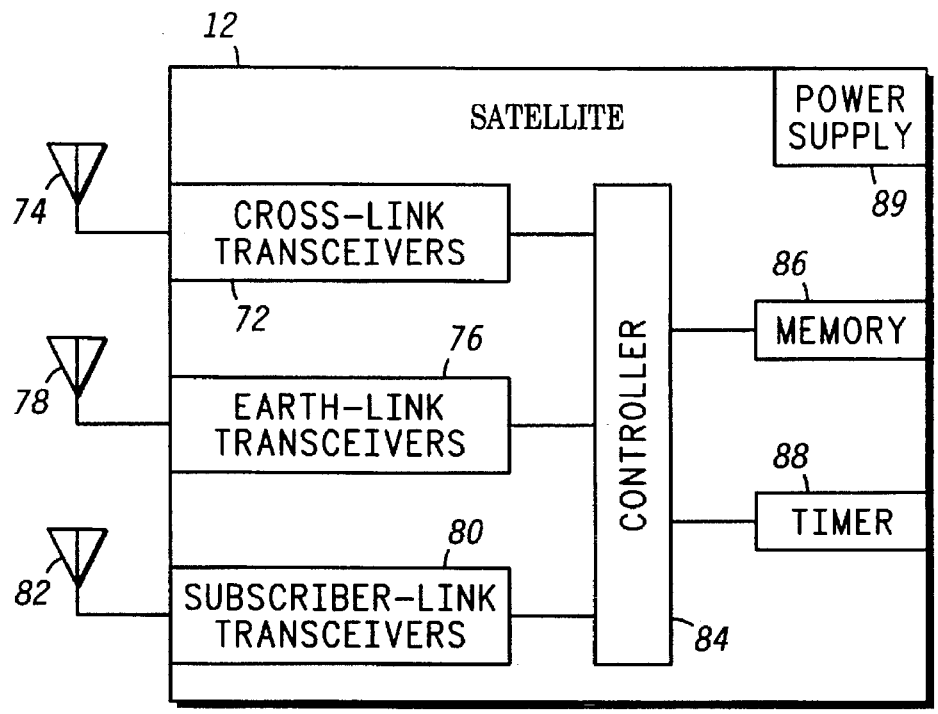
FIG. 3 illustrates a simplified block diagram of a satellite radio communication station suitable for use in a preferred embodiment of the present invention.

FIG. 3 illustrates a simplified block diagram of a satellite radio communication station 12 suitable for use in a preferred embodiment of the present invention. Preferably, all satellites 12 within communication system 10 (see FIG. 1) include equipment as illustrated by the block diagram of FIG. 3. Satellite 12 includes cross-link transceivers 72 and associated antennas 74. Transceivers 72 and antennas 74 support cross-links to other nearby satellites 12. Earth-link transceivers 76 and associated antennas 78 support Earth-links to communicate with Earth terminals 24 (FIG. 1). Moreover, subscriber link transceivers 80 and associated antennas 82 support communication with subscriber units 26 (FIG. 1). Preferably, each satellite 12 may simultaneously support a link for up to several thousand or more subscriber units 26 (FIG. 1). Of course, those skilled in the art will appreciate that antennas 74, 78, and 82 may be implemented either as single multi-directional antennas or as banks of discrete antennas. It is desirable that subscriber link antenna 82 be a phased array antenna capable of accessing many cells 32 (FIG. 1) simultaneously.

A controller 84 couples to each of transceivers 72, 76, and 80 as well as to a memory 86, timer 88 and power supply 89. Controller 84 may be implemented using one or more processors. Controller 84 uses timer 88 to maintain, among other things, the current date and time. Memory 86 stores data that serve as instructions to controller 84 and that, when executed by controller 84, cause satellite 12 to carry out procedures which are discussed below. In addition, memory 86 includes variables, tables, and databases that are manipulated due to the operation of satellite 12. Power supply 89 desirably include batteries, solar cells and/or solar panels. As part of a power management system, satellite 12 desirably includes power panels which distribute power to portions of the satellite. In a preferred embodiment, there are three sets of subscriber link transceivers 80, each of which may be associated with separate subscriber link antennas 82. In this embodiment one power panel regulates and distributes power to one set of subscriber unit transceivers 80. The precise method of distributing power aboard an individual satellite is not important for the present invention and other methods besides the use of panels may be used.

It is essential for satellite nodes 12 to conserve the limited energy resources available. As previously discussed, satellite nodes 12 include, among other things, solar panels and batteries to provide electrical energy for satellite operations.

The transmission power ability of satellite 12 to communicate with subscriber units 26 located on the surface of the Earth is limited to the resources of satellite 12. In some situations, it is possible that the number of subscriber units 26 in communication with a satellite node will exceed the satellite's ability to provide enough energy to communicate effectively with all subscriber units located within it's area of coverage. For example, satellite 12 may pass over a densely populated area having a high demand for communication services, such as Europe, Japan or India and may not have sufficient energy reserves to handle the demand for communication services when satellite 12 passes over the high demand area. The present invention transfers at least a portion of the demand to a neighboring satellite with overlapping beams or footprints 34 (FIG. 2) that is not-experiencing as high a demand for services.

Subscriber link transceivers 80 are desirably multi-channel FDMA/TDMA transceivers capable of transmitting and receiving on all different selectable frequencies during particular, selectable, time-slots as directed by controller 84. Subscriber link transceivers 80 include multi-channel radios having sufficient number of channels to provide the desired number of transmission and reception frequencies and time-slots for signal access and control and for the user voice and/or data. Controller 84 may provide for allocation of the frequency and time-slot assignments, cell-to-cell hand-off and other overhead and management and control functions.

Figure 4:
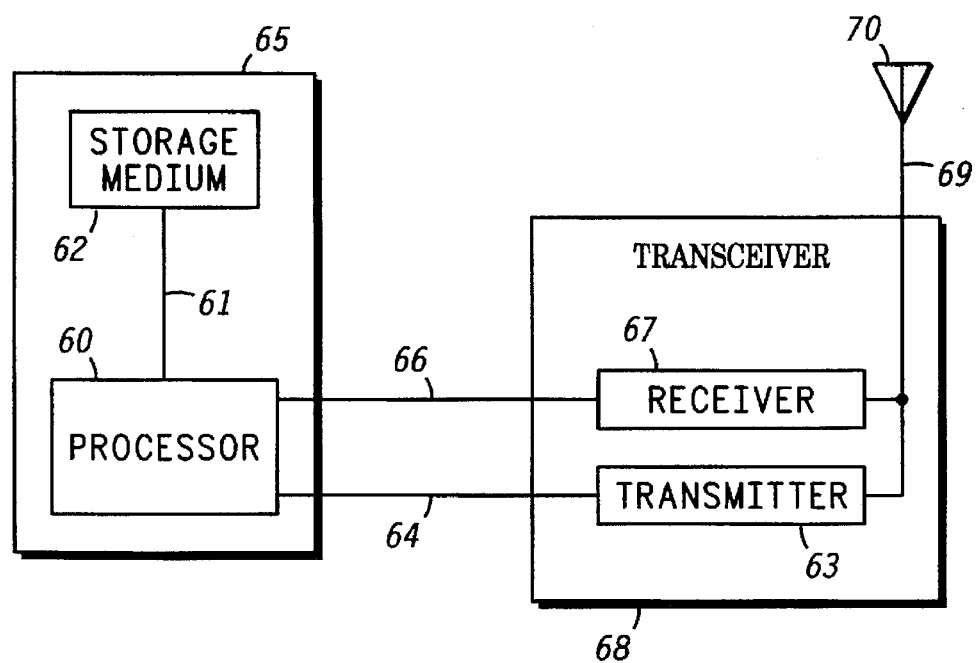
FIG. 4 illustrates a simplified block diagram of a system control station and an Earth terminal suitable for use in a preferred embodiment of the present invention.

FIG. 4 illustrates a simplified block diagram of system control station 65 and an Earth terminal 68 suitable for a preferred embodiment of the present invention. Control station 65 and Earth terminal 68 are desirably part of SCS 28 (FIG. 1) and ET 24 (FIG. 1) respectively. Control station 65 comprises processor 60 coupled to associated storage medium 62 (e.g., random access memory or RAM, other semiconductor or magnetic read-write memory devices, optical disk, magnetic tape, floppy disk, hard disk etc.) via link 61. Earth terminal 68 includes antenna 70 coupled to transmitter 63 and receiver 67 via link 69. Transmitter 63 and receiver 67 are coupled to processor 60 via links 64 and 66, respectively. Processor 60 desirably carries out procedures exemplified below and described in associated text. For example, in addition to performing other tasks as appropriate, processor 60 desirably stores results from such procedures in storage medium 62. Transmitter 65 and/or receiver 67 transmit messages to and/or receive messages from satellites 12.

Processor 60 generally controls and manages subscriber unit access, message reception and transmission, channel set-up, radio tuning, frequency and time-slot assignment, and other cellular radio communication and control functions not managed or provided for by controller 84 (FIG. 3). Among other things, processor 60 and/or controller 84 (FIG. 3) desirably execute procedures to allow subscriber unit access to communication system 10. This may include procedures for protocols for channel setup and other associated functions as discussed below.

In the preferred embodiments of system 10, the framing and management of the electromagnetic spectrum is desirably controlled by satellites 12 and/or SCS 28. SUs 26 adapt their operations to meet requirements established by satellites 12 and/or SCS 28.

Figure 5:
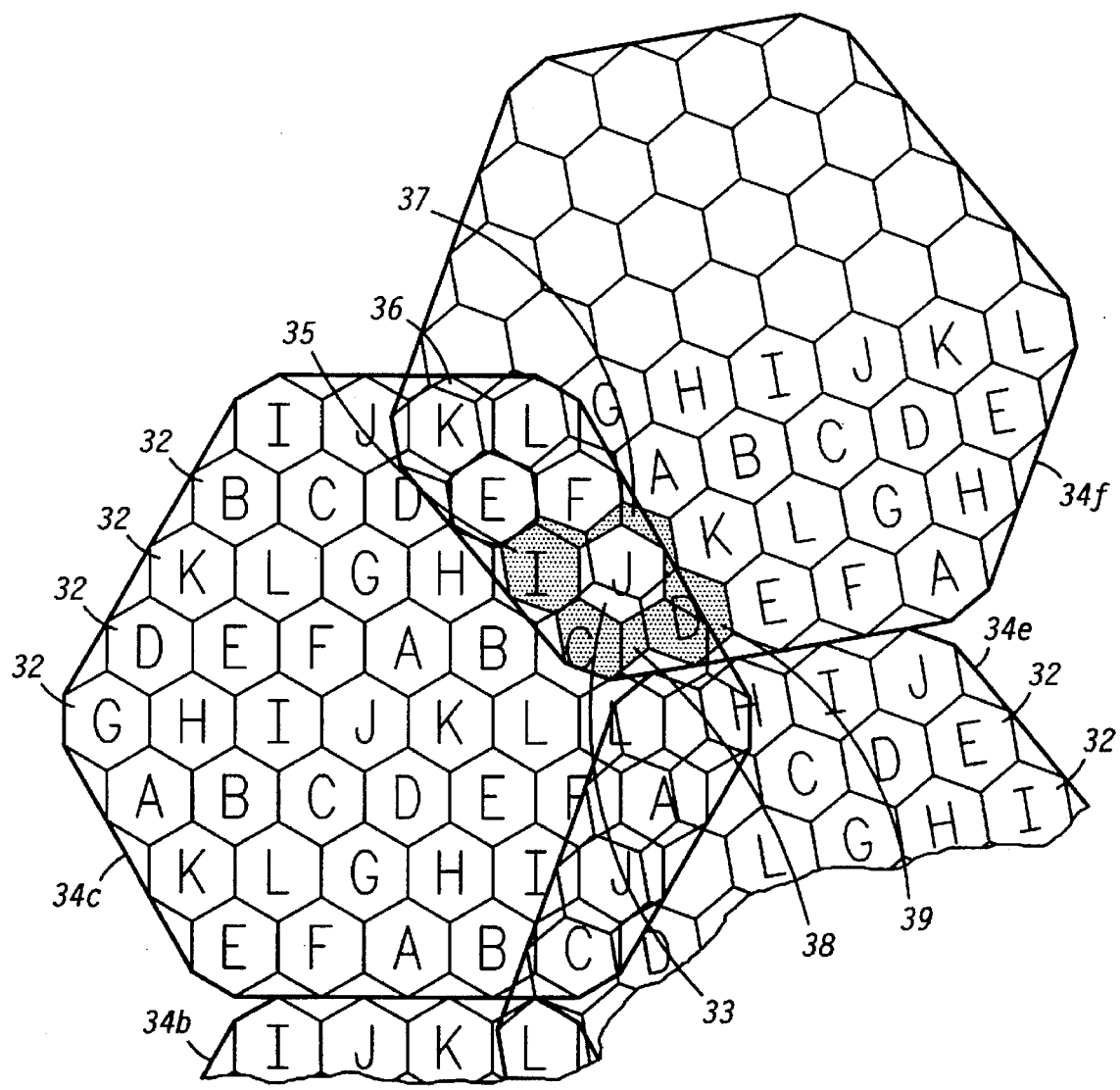
FIG. 5 graphically depicts an expanded view of an overlap region between footprints of satellites which may be generated by a preferred embodiment of the system.

FIG. 5 graphically depicts an expanded view of overlap region 36 between footprints of satellites 12 which may be generated by a preferred embodiment of the system. FIG. 5 shows cell 33 of footprint 34c produced by satellite 12c (not shown) located in overlap region 36. Further, cells 35, 37, 38 and 39 are also shown as located in overlap region 36, but cells 35, 37, 38 and (shown as shaded) are part of footprint 34f produced by satellite 12f (not shown). Note that cells 35, 37, 38 and 39 of footprint 34f overlap cell 33 of footprint 34c. Satellite 12c may be presently experiencing heavy user traffic conditions. As satellite 12c moves toward a pole, footprint 34c overlaps footprint 34f. As part of the normal cell management process, several beams or cells 32 located in overlap region 36 in footprint 34f are turned off as the overlap occurs conserving resources of satellite 12f.

For example, when satellite 12c experiences a heavy demand for communication services and satellite 12f is not experiencing a heavy demand for communication services, cells of satellite 12f located within overlap region 36 are turned on and at least some demand is transferred from satellite 12c to satellite 12f. A portion of the demand for satellite 12c must reside within overlap region 36.

When there is heavy traffic in cell 33 of footprint 34c, and cells 35, 37, 38, and 39 of footprint 34f may be turned off as part of cell management because of the overlap in coverage. Traffic from cell 33 is transferred either wholly or in part to cells 35, 37, 38, and 39 of footprint 34f, thus reducing demand for power in satellite 12c. Where all the traffic is transferred from cell 33, cell 33 may desirably be turned off further reducing the demand for power. To prevent interference between cells having similar reuse units, channel assignments are redone.

In a preferred embodiment, after cell 33 is shut off, this process is repeated for other overlapping cells of satellite 12c until the power drain of satellite 12c is within a predetermined limit. The process may be repeated until nearby satellites with sufficient overlap of cells are near their power limit. This process is desirably repeated for each cell of every satellite 12 of the constellation on a regular basis.

Figure 6:
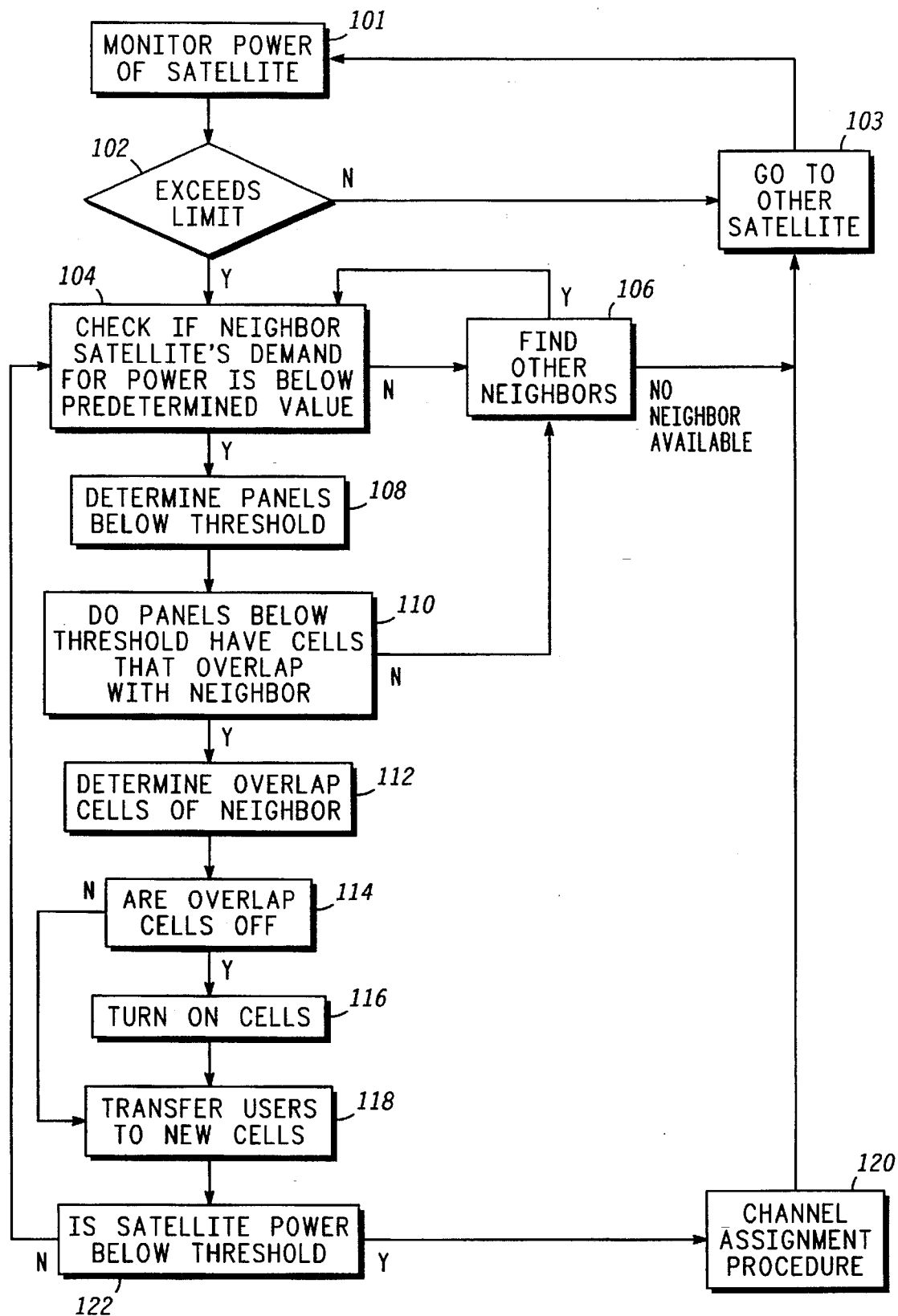
FIG. 6 shows a flow chart of a load sharing procedure suitable for use in a preferred embodiment of the present invention.

FIG. 6 shows a flow chart of load sharing procedure 100 suitable for use in a preferred embodiment of the present invention. Task 101 monitors the power consumption of a satellite of the constellation. SCS 28 (FIG. 1) desirably performs the monitoring. Historic data on traffic loading and tables on cell shut-off are used. Power consumption includes satellite average power, satellite instantaneous power or any combination of these measures. Task 102 determines whether, at a specific instant in time, the traffic load experienced by the satellite exceeds a maximum number of subscriber units the satellite can provide for. This may be done by monitoring the power consumption levels and comparing it to a predetermined power limit. Other methods of monitoring traffic load include the use of the battery charge state or the battery charging current status. Those of skill in the art will understand that other methods of determining satellite power loading will also work in the present invention.

In a preferred embodiment, when the satellite is not exceeding its power limit task 103 increments the satellite number being considered and proceeds to task 101 where the next satellite's power is monitored. In this way, the power consumption of all the satellites in the constellation is checked.

Task 104 initiates a load sharing procedure when the number of subscriber units, as determined by task 102 exceeds a maximum predetermined capacity. Task 104 determines which other satellites of the constellation are neighboring satellites for the purpose of load sharing. The number of neighboring satellites depends on several factors including their location. For example, when satellites are in polar orbits, a satellite will have more neighboring satellites near the pole than near the equator resulting in increased footprint overlap. Other factors considered in determining neighboring satellites include altitude of the satellites, the number of satellites in the constellation, and the orbital plane of each satellite. Task 104 may employ several methods for determining neighboring satellites including finding the distance between a satellite "center" and all other satellite "centers" of the constellation, and selecting those satellites which are within a predetermined distance.

Task 104 may also determine the power consumption of a selected neighbor satellite. Since, in a preferred embodiment, task 101 monitors the power consumption of all satellites in the constellation, instantaneous and average power consumption data is available for neighbor satellites. Other methods of monitoring power consumption may include the use of the battery charge state or the battery charging current status. If the selected neighbor satellite is below a predetermined maximum power limit for load sharing, the neighbor satellite will be considered for load sharing.

Task 106 considers other neighbor satellites when the neighbor satellite selected in task 104 is not below the predetermined maximum power limit for load sharing. Task 106 desirably selects other neighbor satellites from a list generated in task 104. The list preferably ranks neighbor satellites in order of preference, which in a preferred embodiment, the list is based on distance.

Task 108 determines which panels of the overloaded satellite are below their threshold level. In a preferred embodiment of the present invention when the antenna system of the satellite includes only cells and no panels, task 108 is not implemented. On the other hand, where the satellite antenna configuration includes panel elements, each panel element distributes power to several cells so that the antenna system can manage its antenna transmitting power more efficiently. Furthermore, by using panels for power distribution, a satellite can control its antenna beams patterns on the Earth for subscriber units more efficiently. The number of panels implemented in the antenna system depends on the satellite system configuration. Desirably, a satellite may have three, six or any number of panels to meet the satellite's systems specific requirements. Where the satellite has three panels for example, each panel will distribute the power for one-third of the cells that are illuminated on the Earth by that satellite.

For each neighboring satellite, as determined in task 104, task 108 finds the neighboring satellites associated panels. Task 108 further determines the power consumption of each panel of the neighboring satellite due to its traffic load. The traffic load of each panel is based on the summation of the traffic load of each of the cells associated with that panel. Task 108 further determines the panels of the neighboring satellite which have power consumption below a predetermined limit. Each panel of the neighboring satellite will be considered as potential candidate for traffic load sharing. The panels of the neighboring satellite which have a traffic load above a predetermined line will not be considered as potential candidates for traffic load sharing.

Task 110 selects one panel which is considered to be a traffic load sharing candidate for the neighboring satellite considered. In a satellite system where satellites are moving and approaching a pole, there is an increasingly significant overlap of antenna pattern coverage from neighboring satellites. The overlap in coverage may vary from substantially no overlap at the equator up to more than fifty-percent at the poles. Overlap is defined as the region on the ground wherein a subscriber unit or other ground based user transmitting to and receiving from a satellite would be within the antenna pattern of two or more satellites. From the panels selected, task 110 determines which cells comprise this panel element. From these cells task 112 determines which cells of the neighboring satellite are overlapping with cells from the overloaded satellite.

As shown in FIG. 5 for example, satellite 12c is assumed to be in an overloaded condition. Satellite 12f, a neighboring satellite of satellite 12c is assumed to be within its power consumption limits. FIG. 5 shows cell 33 of footprint 34c overlapping with cells 35, 37, 38 and 39 from footprint 34f of satellite 12f. The cells shown in FIG. 5 are for demonstration purposes only. The actual cell configuration may be quite different, for example, cells 33 of satellite 12c may eventually turned off by the normal cell management processes as previously described.

Task 114 checks to make sure that the cells from the neighbor satellite are turned off as part of a normal cell management process previously discussed. For example, cells 35, 37, 38 and 39 of footprint 34f may be turned off in the normal cell management process. When the cells of the neighbor satellite are not turned off, procedure 100 goes to task 118. Task 116 turns on those cells because they are candidates for sharing traffic load from cell 33 of satellite 12c.

Task 118 transfers subscriber units from cell 33 of satellite 12c to either of cells 35, 37, 38, or 39 of satellite 12f. The number of subscriber units to be transferred from the originally overloaded cell 33 is dependent on the type of satellite system, traffic load distribution and power loading of each antenna and/or panel element on the satellite. In a preferred embodiment, most or all of the subscriber units from the overloaded cell are transferred to the load sharing candidate cells. Any combination of transferring all, most or just a few subscriber units from the traffic overloaded cells to the load sharing cells can be implemented as part of the load sharing process.

The transfer of subscriber units from one cell to another can be accomplished by techniques well known in the art and include causing the subscriber units initiating a handoff, or changing power levels between the cells so that the change in cell is invisible to the subscriber unit.

Task 122 recalculated the power consumption of the originally overloaded satellite after some combination of subscribers are transferred from the overloaded satellite cells to a load sharing candidate cell. Task 122 also checks to see when the power consumption is below a predetermined power limits. If the satellite is not below a threshold power limit, the process is reiterated to find other possible load sharing candidate cells of a neighbor satellite to transfer subscriber units from the overloaded satellite to newly found candidate cells of the neighbor satellite.

When the satellite is below its threshold power level, and its load sharing process has been implemented for all overloaded satellites, a procedure to assign channel assignments is performed in task 120. Since the cells in the normal cell management process have been reactivated and a certain amount of subscriber units have been transferred to these originally turned off cells, the system control station needs to reassign and/or reallocate channels to these newly transferred subscriber units. In the preferred embodiment of the present invention, a channel assignment procedure can be implemented as described in U.S. Pat. No. 5,268,694 entitled "Communication System Employing Spectrum or Use on a Spherical Surface" assigned to the assignee as the present invention which is incorporated herein by reference. Procedure 400 (FIG. 13) shows an example of a channel assignment procedure which may be used in a preferred embodiment of the present invention. Procedure 400 is discussed below.

Figure 7:
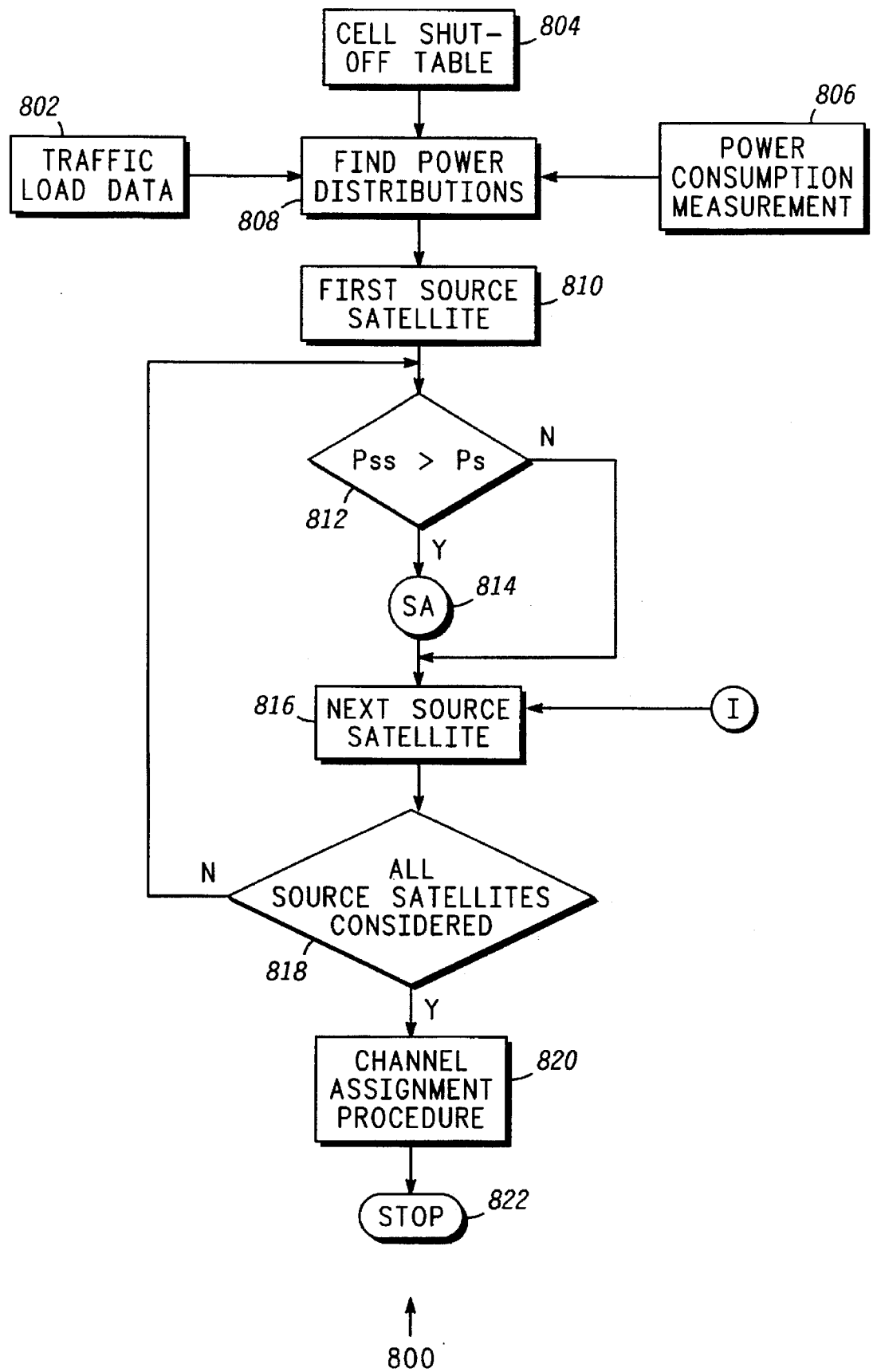
FIG. 7 shows a flow chart of a load sharing procedure for a constellation of satellites suitable for use in a preferred embodiment of the present invention.

FIG. 7 shows a load sharing procedure for a constellation of satellite communication nodes suitable for use in the preferred embodiment of the present invention. Task 802 utilizes satellite traffic load data as a function of time which is generated using a traffic load generator. Traffic load generators are well known in the art. In the traffic load generator used for the present invention, worldwide traffic load is desirably estimated to be about 1½ times that are the estimated traffic load at a future time, for example in the year 2002. A cell on/off table resulting from implementing the normal cell management process is incorporated in the load generator to decide which cell or cells are shut off due to its overlap with the cells of neighboring satellites. After implementing the traffic load generator, the traffic load in each cell and panel can be estimated and consequently the traffic load of each satellite can be determined. Task 804 uses the cell shut-off/turn-on table resulting from implementing the normal cell management process to determine which cell is originally turned off due to overlapping. The information is utilized to determine which cells of neighboring satellites can be turned on later.

Task 806 takes a measurement of satellite power consumption or power condition, and preferably measures the instantaneous and/or average power consumption of each satellite cell and satellite panel. In a preferred embodiment, the power level may be based on instantaneous power, average power, battery charge status or some combination thereof. Task 808 determines the power consumption of each cell and panel of the satellite. Preferably, task 808 determines the power consumption of each cell and panel for each satellite of the constellation.

Task 810 selects a satellite of the constellation to examine for load sharing. The satellite examined is herein referred to as a source satellite. Task 810 sets the source satellite to source satellite number 1 to begin checking all satellites of the constellation. Task 812 determines whether the load of the first satellite exceeds a predetermined limit. In the preferred embodiment this procedure 800 is repeated for every satellite in this system.

Task 814 is performed when the source satellite power limit, including power consumption and/or charge state is above a predetermined power limit as determined by task 812. Task 814 executes procedure 700 (FIG. 8) which determines neighboring satellites that have available capacity. Procedure 700 is discussed below. Task 816 increments the source satellite number because the test source satellite is now either below its power limit load it does not need to implement any load sharing strategy, or there are no neighboring satellites available to shift load to.

Task 818 determines when the satellite number considered is greater than the total number of satellites in the constellation, and sends the procedure to task 820. When there still remains satellites in the constellation to be checked, the procedure goes back to task 812 to check a next source satellite. In a preferred embodiment, there are 66 satellites in the constellation to check.

When task 820 is executed, the power consumption of all satellites in the constellation has been checked. Task 820 executes a channel assignment procedure. In the preferred embodiment, channel assignment procedure 400 (FIG. 13) is executed. Procedure 400 is discussed below. Procedure 400 assigns and/or reassigns channels to all subscribers in the constellation so as to reduce the resulting interference level in the constellation. Potential interference results from originally turned off cells turned on due to traffic load sharing. In task 822, all satellites of the configuration have been checked and a channel assignment procedure has been implemented. The load sharing process is complete and the program is subsequently stopped. In the preferred embodiment, procedure 800 is repeated once every 30 seconds to once every minute.

Figure 8:
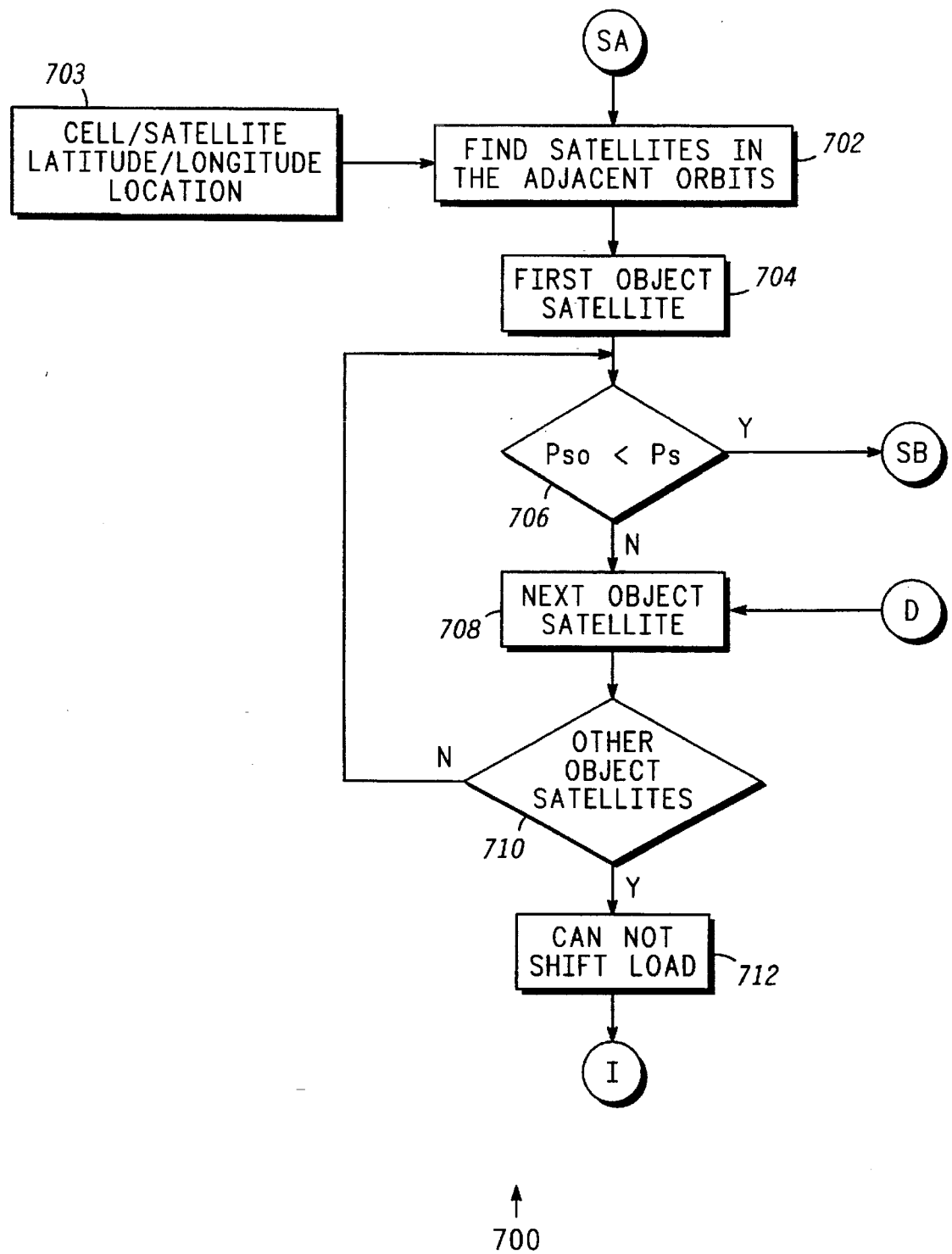
FIG. 8 shows a flow chart of a procedure for determining neighboring satellites suitable for use in a preferred embodiment of the present invention.

FIG. 8 shows a flow chart of procedure 700 for determining neighboring satellites suitable for use in the preferred embodiment of the present invention. Procedure 700 is preferably executed when a satellite has a traffic load exceeding its power limit as determined in task 812 (FIG. 7). Task 702 determines the neighboring satellites of the source satellite. Each neighboring satellite must at least a portion of one cell overlapping with cells of the source satellite to be considered for load sharing. The number of neighboring satellites considered depends on the constellation load distribution. Furthermore, the number of neighboring satellites considered depends on the constellation configuration including the number of satellites and number of cells associated with each satellite. The neighboring satellites are herein referred to as object satellites.

Figure 9:
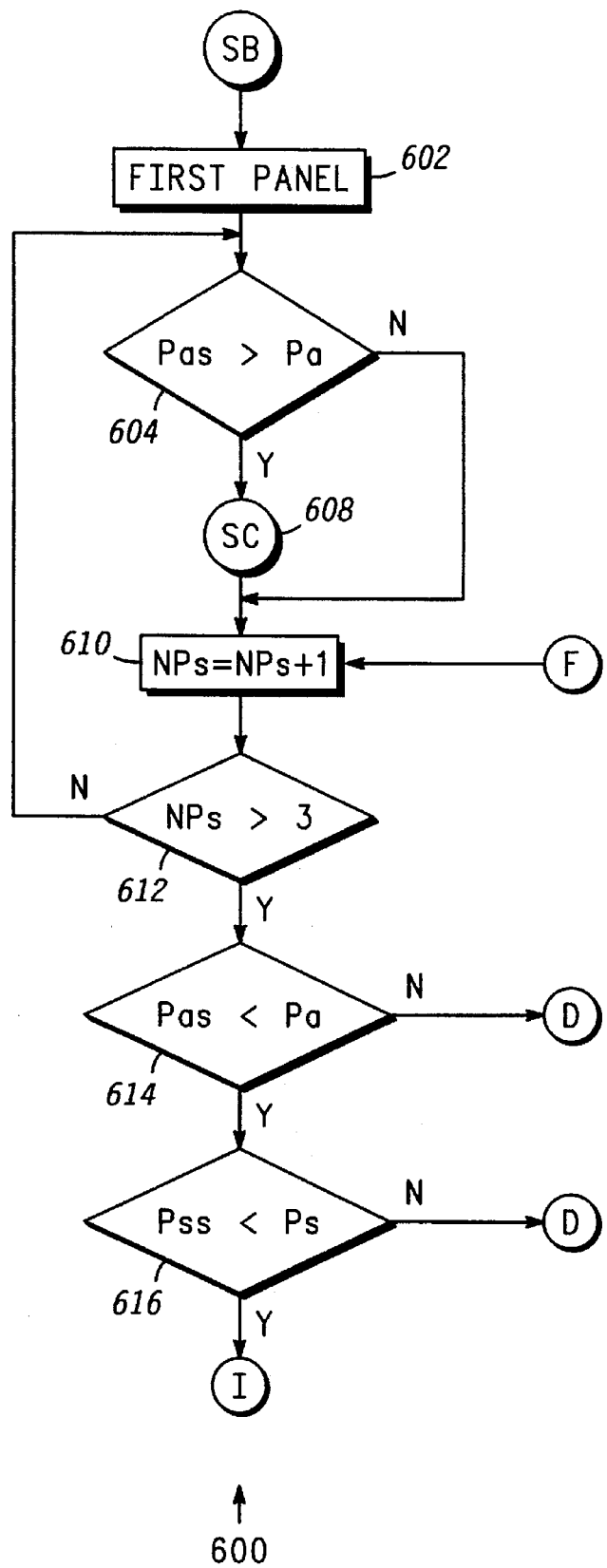
FIG. 9 shows a flow chart of a procedure for determining power loading of panels of source satellites suitable for use in a preferred embodiment of the present invention.

Task 703 tabulates each cell of the source and each object satellite in a data file or in some other convention form so that procedure 700 may be implemented. In the preferred embodiment, satellite cell locations include longitude and latitude location of each satellite as a function of time. Task 704 considers the first object satellite. Task 706 checks the load condition of the object satellite to determine when the power consumption of the object satellite (Pso) is below a predetermined power limit (Ps). When the object satellite is below the predetermined power limit, the object satellite is a suitable candidate for load sharing and the procedure goes to statement SB. Statement SB executes a procedure for determining the power loading of panels in the object satellite. In a preferred embodiment, procedure 600 of FIG. 9 is executed. FIG. 9 is discussed below.

If the traffic load of the object satellite is above the predetermined limit, task 708 is executed. Task 708 goes to another object satellite that was found in task 702. Task 710 determines that subscriber units cannot be shifted from the source satellite to an object satellite when the object satellite number is greater than the total number of object satellites as determined by task 702. In other words, there are no neighbor satellites with overlapping cells to shift some of the traffic load to. In a preferred embodiment, operators at a satellite control center will be notified of this situation by task 712.

After a control center is notified that the source satellite is experiencing a traffic above a predetermined level and that no neighbor satellites exist to share the load, procedure next goes to statement I. Statement I returns to task 816 of procedure 800 (FIG. 7). Task 816 increments the satellite node by one and procedure 800 then considers the next source satellite for load sharing.

Figure 10:
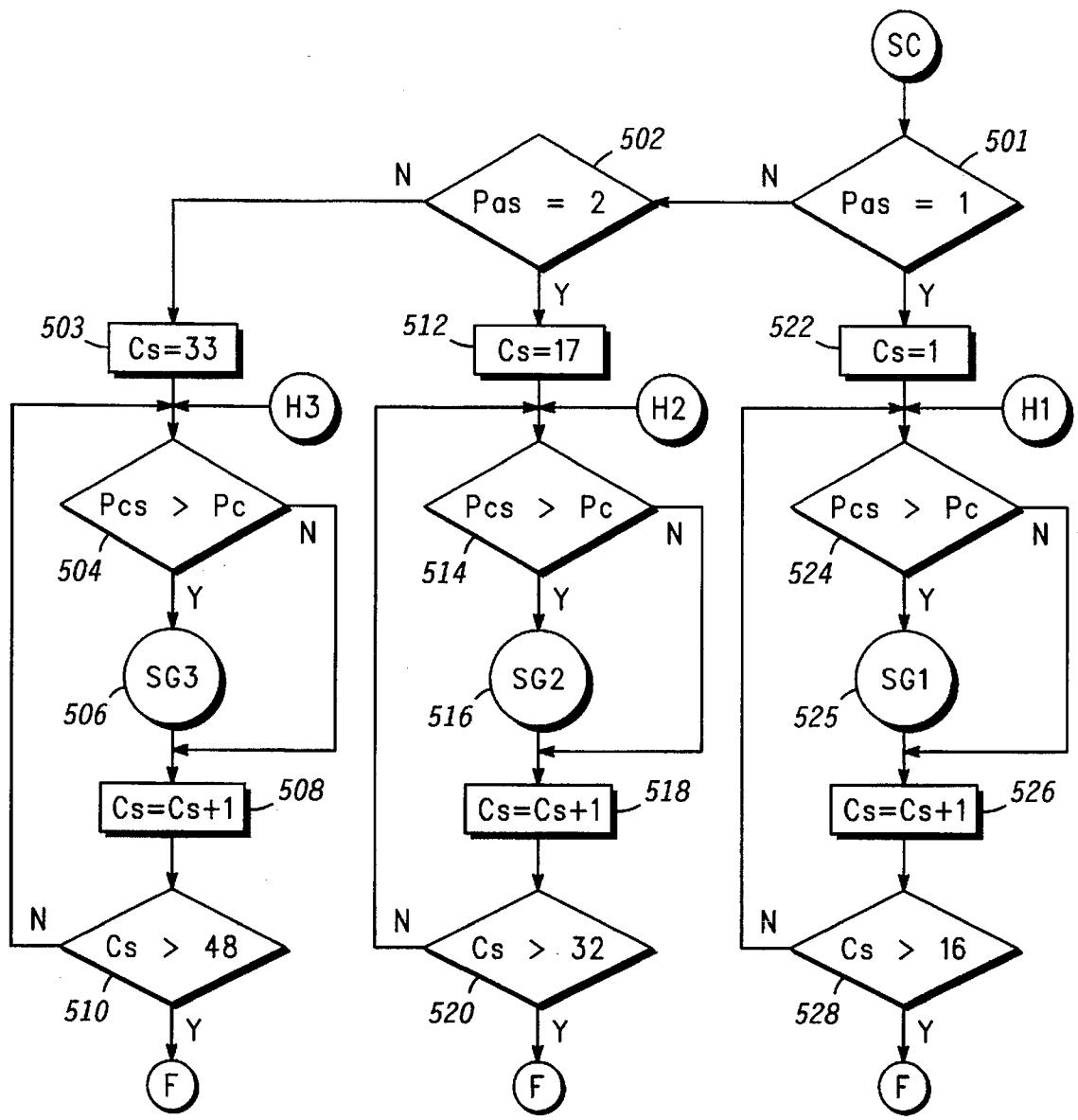
FIG. 10 shows a flow chart of a procedure for determining power loading of cells of a source satellite suitable for use in a preferred embodiment of the present invention.

FIG. 9 shows a flow chart of procedure 600 for determining power loading of panels in a source satellite. As discussed previously, procedure 600 is initiated from task 706 and FIG. 8 when the object satellite is below a predetermined power limit. Task 602 selects a first panel from the source satellite. Task 604 checks the power load of the source panel. If the power load is above a predetermined panel load limit, the procedure goes to statement SC task 608. Otherwise, this task is skipped and the procedure goes to task 610. Statement SC executes a procedure for determining loading of cells of the source satellite. In a preferred embodiment, procedure 500 (FIG. 10) is executed. FIG. 10 is discussed below.

When the first panel of the source satellite is below the predetermined panel limit, task 610 goes on to the next source panel. Task 612 determines when the source panel number is greater than the number of panels on the source satellite. In a preferred embodiment, there are three panels on each satellite. If the source panel is greater than 3, procedure 600 goes to task 614 since no more source panels need to be checked. When there are more source panels to check, procedure 600 goes back to task 604 to check that source panel load. Although task 612 shows a example where a satellite has three source panels, those with skill in the art will understand that more or less than 3 source panels are not important for the present invention. Task 614 all source panel loads are checked. If any of these loads are under the panel load limit then procedure 600 goes to task 616. If any panel is above the panel load limit, procedure 600 goes to statement D. Statement D refers back to procedure 700 (FIG. 8) for determining the next neighboring satellite. At this point, the other neighboring (object) satellites need to be considered for load sharing.

Task 616 checks the source satellite load. If this load remains above the satellite power limit, other object satellites must be considered to have additional source satellite load transferred and shared. When the source satellite load is above the predetermined limit, procedure 600 goes to statement D (previously discussed). If the source satellite power load is below a predetermined limit, procedure 600 goes to statement I to check another source satellite. Statement I refers back to task 816 of procedure 800 (FIG. 7) which increments the source satellite by one going on to the next source satellite considered for load sharing.

FIG. 10 shows a flow chart of procedure 500 for determining power loading of cells of a source satellite suitable for use in the preferred embodiment of the present invention. Tasks 501 and 502 determine which panel (Pas) on the source satellite is overloaded. If the overloaded panel of this source satellite is panel number 1, task number 522 is executed. Task 522 sets the cell number (Cs) of the source satellite being considered to source cell number one. Task 524 checks the loading (i.e., traffic level) of the source cell and when the load is above the limit it goes to statement SG1. Statement SG1 executes a procedure for determining cells of the object satellite in which to shift load to. In a preferred embodiment, procedure 200 (FIG. 11) may be executed. Procedure 200 is discussed below.

When the source cell is below a predetermined traffic level, task 526 goes onto the next source cell. Task 528 determines when all source cells under control of the first panel have been considered. In a preferred embodiment, there are 16 cells under the jurisdiction of each panel. The procedure goes to statement F when all cells under the jurisdiction of the first panel have been considered. Statement F returns to task 612 of procedure 600 (FIG. 9) which goes on to the next source panel. When all cells under the jurisdiction of the panel have not been considered, the procedure goes to task 524 to check a next source cell.

When the source panel is set to the second panel task 512 is executed which sets the source cell to the first cell under the jurisdiction of the second panel. In the preferred embodiment where each panel controls power to sixteen cells, task 512 sets the source cell to cell number 17. Task 514 checks the source cell load. If the load is above the cell load and it goes to statement SG2. When the source cell load is below the predetermined limit, task 518 is executed. Task 518 increments the source cell number by one. Task 520 goes to statement F when the source cell number is greater than the maximum number of cells under the jurisdiction of both the first and second panels. Statement F returns to task 612 of procedure 600 (FIG. 9) which goes on to the next source panel. If all cells under the jurisdiction of the second panel have not been considered, the procedure goes back to task 514 to check the next source cell load.

In the preferred embodiment, when the source cell panel is neither the first or second, the source panel must be the third panel. In this case, task 503 sets the source cell to number 33. Task 504 checks the source cell to determine when the load is above a predetermined cell load limit. When the source cell is above the predetermined cell load limit, statement SG3 is executed. Statement SG3 executes a procedure for determining cells of object satellites available for load sharing. In a preferred embodiment, procedure 200 (FIG. 11) is used. When the source cell is below the predetermined limit, task 508 is executed. Task 508 increments the source cell number. Task 510 determines when all source cells under control of the third panel have been considered. In the preferred embodiment, the maximum cell number in the third source panel number is 48. When the source cell number is greater than the maximum number, procedure 500 goes to statement F. When the source cell number is less than the maximum number for the third panel, procedure 500 goes to task 504 to check the next source cell load. Statement F returns to task 612 of procedure 600 (FIG. 9) which goes on to the next source panel.

Figure 11:
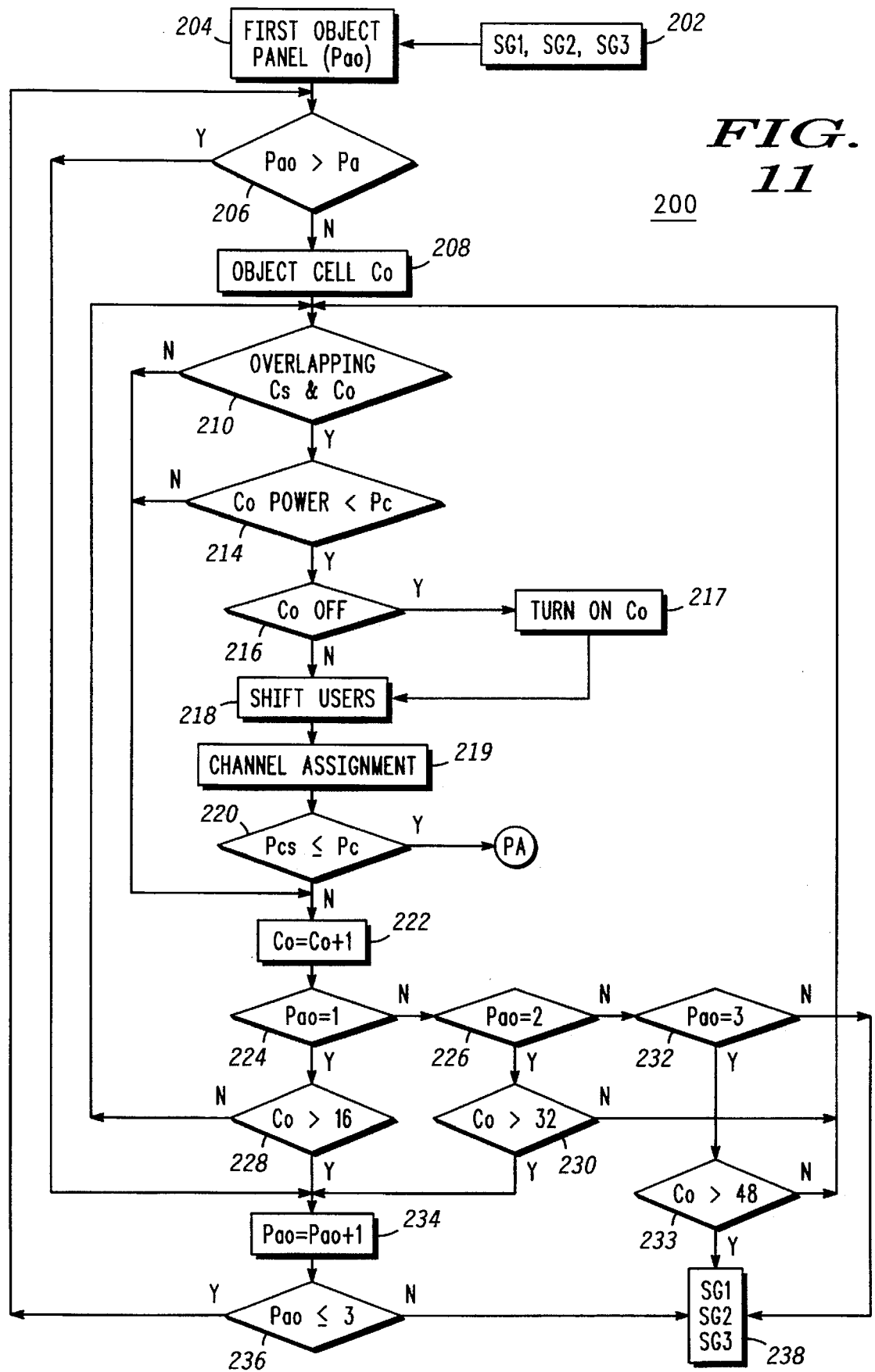
FIG. 11 shows a flow chart of a procedure for determining cells of object satellites available for load sharing suitable for use in a preferred embodiment of the present invention.

FIG. 11 shows a flow chart of procedure 200 for determining cells of object satellites available for load sharing suitable for use in a preferred embodiment of the present invention. Task 202 is the entry statement for statements SG1, SG2, or SG3 of procedure 500 (FIG. 10). As determined in procedure 700 (FIG. 8), one of the object satellites will share some traffic from the overloaded source satellite that has been identified. Panels of the object satellite share traffic from cells of the source satellite.

Task 204 considers the first panel of the object satellite for load sharing. Panels on object satellites are herein referred to as object panels. Task 206 checks the power consumption of the object panel. If the power consumption of the object panel is below a predetermined panel power limit, the object panel is a candidate to share source cell traffic load. If the power consumption is above the panel power limit, procedure 200 goes to task 234 where the next object panel is considered. If the object panel determined by task 206 is below the panel power limit, procedure 200 then finds at least one cell to share source satellite traffic load. In a preferred embodiment, when the object panel is the first panel, the object cell (Co) is set to cell number 1. If the object panel is the second panel, the object cell is set to cell number 17. If the object panel is the third panel, then the object cell is set to cell number 33. Task 210 uses source cell and object cell latitude and longitude locations as determined from task 703 (FIG. 8) and determines the relative distance between the source cell and the object cell. Based on the distance, task 210 determines whether the object and source cells have an overlapping region. Those of skill in the art will understand that many methods exist to find the distance between two points in space and that any of those methods may be used with the present invention.

If the source cell (Cs) and object cell (Co) have an overlap region, some subscribers in the overlapping area may be transferred from the source cell to the object cell. Task 214 checks power loading (Pc) of the object cell (Co) to determine whether it is above a predetermined cell power limit (Pc). If the load is below the limit, procedure 200 proceeds to task 216. When the power load is above the predetermined limit, procedure 200 goes to task 222. Task 216 checks when the object cell (Co) is turned off as a result of the normal cell management process. If the object cell is off, the procedure goes on to task 217. Task 217 turns on the object cell (Co). The object cell is now available to share at least some traffic load from the source cell. Task 218 shifts subscribers from the source cell to the object cell. Task 218 desirably shifts all subscribers from the source cell to the object cell but may, in a preferred embodiment, only shift a portion of subscribers from the source cell to the object cell.

In the preferred embodiment, the number of subscribers transferred depends on the load condition of both the source cell and the object cell. For example, the number of subscribers transferred depends on the power each cell can supply which depends on factors previously discussed. The number of subscribers transferred also depends on the location of the subscribers. Furthermore, some subscribers may not be covered by the antenna pattern of the object cell.

Once subscriber units are shifted from the source cell to the object cell, it may be necessary to assign or reassign channels to prevent interference. Task 219 executes a channel assignment procedure. Procedure 400 (FIG. 13) is an example of a channel assignment procedure which may be used in a preferred embodiment of the present invention. Procedure 400 is discussed below.

Task 220 checks to see when the resulting load of the source cell (Pcs) is below the predetermined power limit (Pc). If the load of the source cell is below the predetermined power limit, the procedure goes to statement PA for further tests. Statement PA executes procedure 300 (FIG. 12) for checking power levels of panels in the source satellite. Procedure 300 is discussed below. If the source cell load is still above its power limit procedure 200 attempts to find another object cell to share the source cell load.

Task 222 is executed when the object cell being considered is neither overlapping with the source cell and the power level of the source cell is above the cell power limit. Task 222 increments the object cell (Co) by one going on to the next object cell to be considered for load sharing. Tasks 224, 226 and 228 determine which panel of the object satellite has jurisdiction over the object cell. If it is the first object panel, procedure 200 goes onto task 228. Task 228 determines when the object cell number exceeds the maximum number of cells under the jurisdiction of the first panel. For example, in the preferred embodiment, there are sixteen cell under the jurisdiction of the first panel. If all cells under the jurisdiction of the first panel have been checked, procedure 200 goes to task 234 to check other object panels (Pao). In the preferred embodiment, when the object cell number is below the number of cells under the jurisdiction of either the first panel, the second panel or the third panel, procedure 200 goes back to task 210 as shown by tasks 228, 230 and 233.

Task 232 determines when the object cells are under the jurisdiction of the third object panel and procedure 200 executes task 233 which checks when the object cell number (Co) exceeds the maximum cells of the object satellite. If the object number is below the maximum number of cells, procedure 200 goes back to task 210. Task 234 increments the panel number of the object satellite. Task 236 determines when all panels of the object satellite have been considered, and when they have, procedure 200 goes to task 238. When all panels have not been considered, procedure 200 goes back to task 206 to check the panel load.

Task 238 returns to task 525, 516 or 506 of procedure 500 (FIG. 10) depending on whether the panel of the source satellite being considered is the first, second, or third panel respectively.

Figure 12:
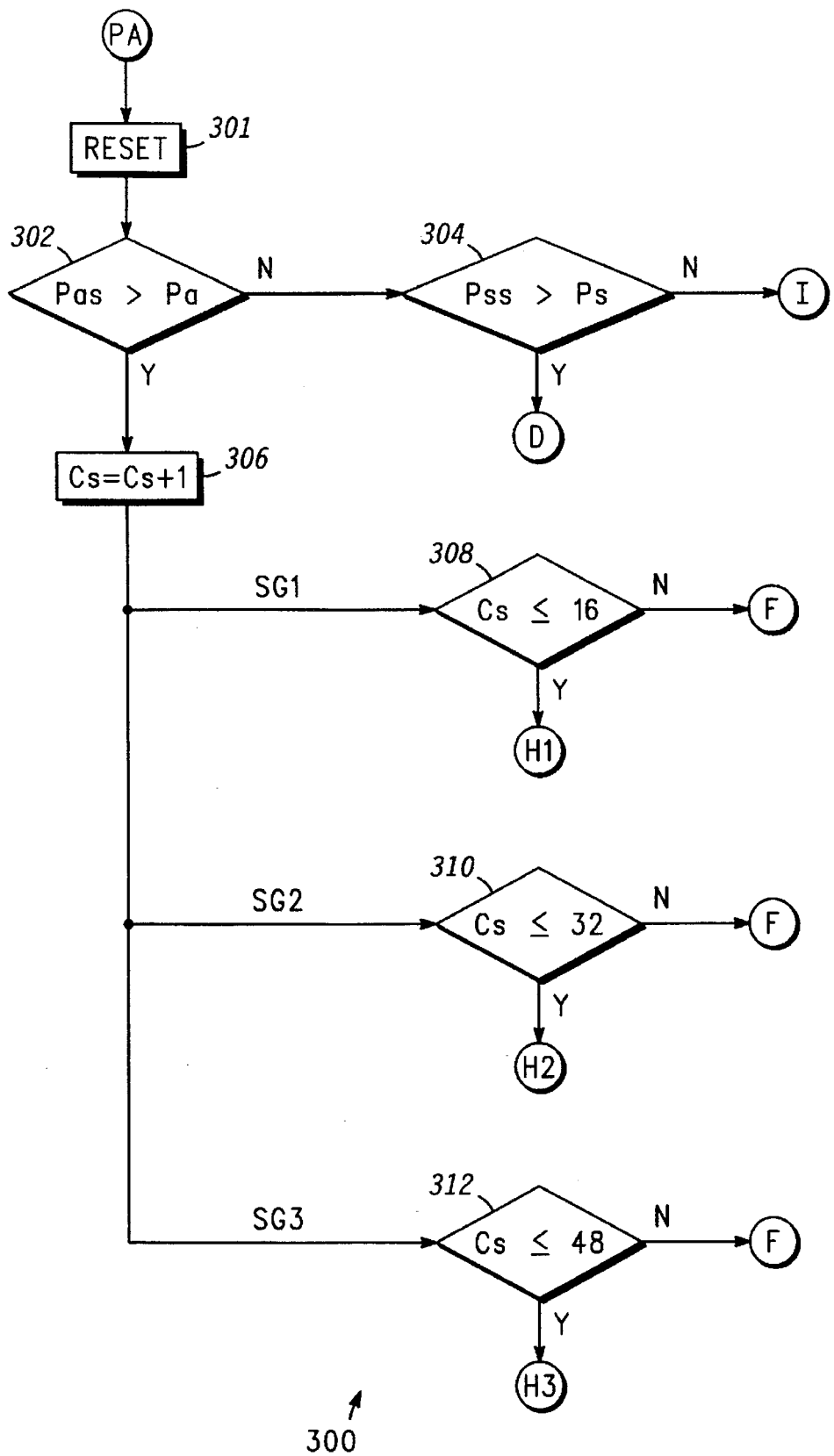
FIG. 12 shows a flow chart of a procedure for checking power levels in panels of a source satellite suitable for use in a preferred embodiment of the present invention.

FIG. 12 shows a flow chart of procedure 300 for checking power levels of panels in a source satellite suitable for use in preferred embodiment of the present invention. Procedure 300 is desirably executed as determined in task 220 of procedure 200 (FIG. 11). Task 301 resets the object panel to the first object panel and resets the object cell to the first object cell. Task 302 checks the source panel power. When the source panel power (Pas) is below a predetermined power limit (Pa), procedure 300 goes to task 304. Otherwise procedure 300 goes to task 306. Task 306 increments the source cell (Cs). If the source panel is the first panel, procedure 300 goes to task 308. If the source panel is the second panel, procedure 300 goes to task 310. Otherwise the source panel is presumed to be the third panel and task 312 is executed. Task 304 checks the source satellite power (Ps) to see when it exceeds the satellite power limit (Pss).

When the source satellite power (Ps) exceeds the satellite power limit (Pss), procedure 200 goes to statement D which returns to task 708 of procedure 700 (FIG. 8). In procedure 700, other neighboring objects satellites are identified for the possibility of transferring satellite source load to these object satellites as previously discussed. When task 304 determines that the source satellite load is below its power limit, procedure 300 goes to statement I which returns to task 816 of procedure 800 (FIG. 7) to check other source satellites as previously discussed. Task 308 determines when the source cell number is greater than the maximum number of cells under the jurisdiction of the first panel, procedure 300 goes to statement F which returns to task 610 of procedure 600 (FIG. 9). Otherwise procedure 300 goes to statement H1 which returns to procedure 500 (FIG. 10). Task 310 determines when the source cell number is greater than the maximum number of cells under the jurisdiction of the second panel and goes to statement F which returns to task 610 of procedure 600 (FIG. 9). Otherwise it goes to statement H2 which returns to procedure 500 (FIG. 10). Task 312 determines when the source cell number is greater than the maximum number of cells under the jurisdiction of the third panel and goes to statement F which returns to task 610 of procedure 600 (FIG. 9). Otherwise it goes to statement H3 which returns to procedure 500 (FIG. 10).

Figure 13:
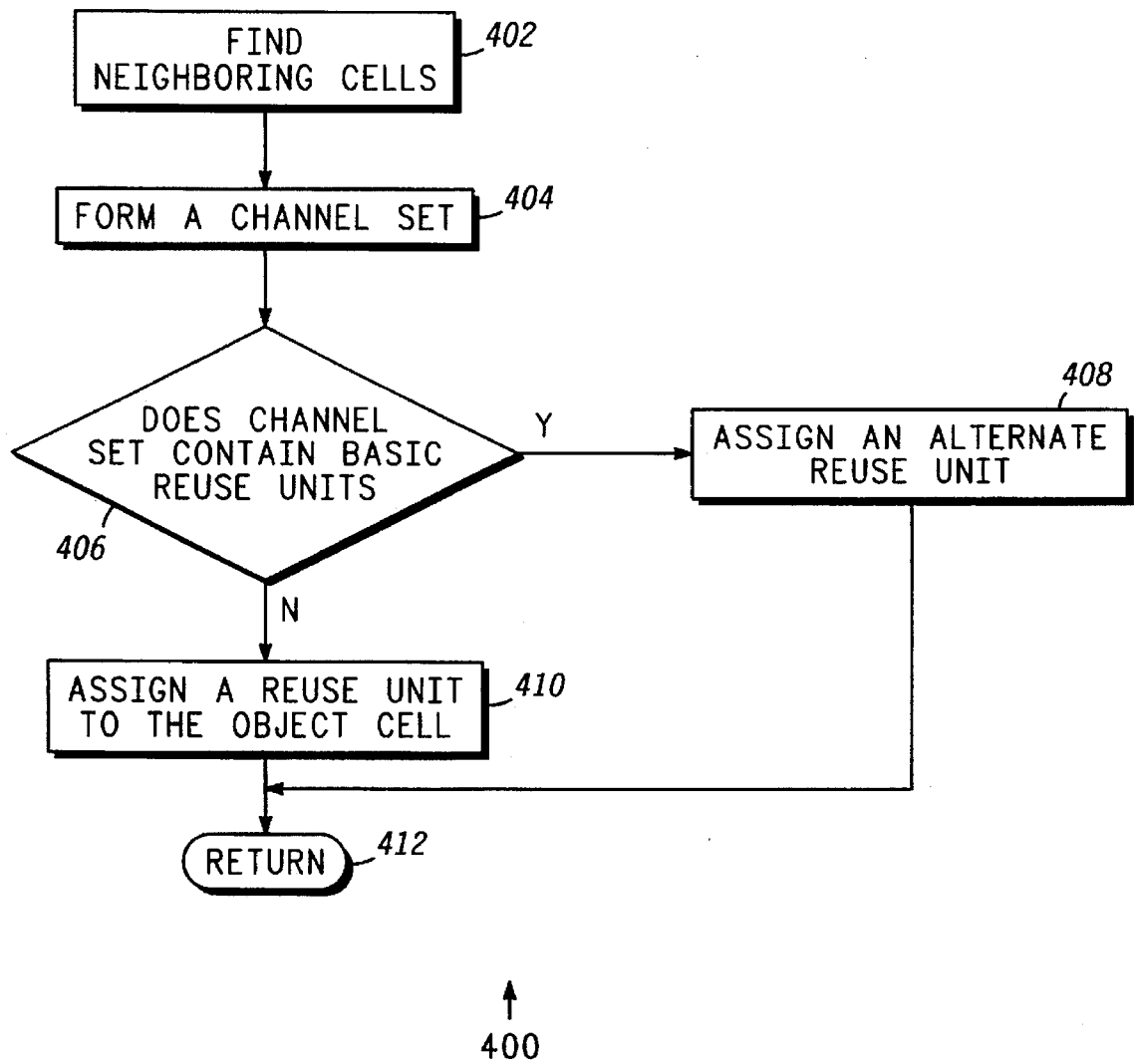
FIG. 13 shows a flow chart of a procedure for channel assignment suitable for use in a preferred embodiment of the present invention.

FIG. 13 shows a flow chart of procedure 400 for channel assignment suitable for use in a preferred embodiment of the present invention. Procedure 400 may be performed as part of task 120 of procedure 100 (FIG. 6), part of task 820 of procedure 800 (FIG. 7) and/or part of task 219 of procedure 200 (FIG. 11). When procedure 400 is executed, subscriber units have been shifted from a source cell to an object cell. Task 402 finds neighboring cells of the object cell that are predetermined distance from the object cell. The neighboring cells with the predetermined distance form a set of cells (Cd). Task 404 determines all channels assigned to cells of set (Cd) and forms a set of channels (Fd). Task 406 checks to see when the set of channels Fd contains all basic reuse units as determined in the channel assignment process. When set Fd contains all basic reuse units, task 408 is executed. When task 406 determines that there are basic reuse units available, task 410 picks an available basic reuse unit and assigns it to the object cell.

Task 408 assigns an alternative reuse unit because no reuse unit is available. In a preferred embodiment, an alternative reuse unit can be found by determining the neighbor cell which is the furthest distance from the object cell, and assigning the same reuse unit assigned to the furthest neighbor cell, to the object cell. Since the reuse unit is assigned to a neighbor furthest away, interference between co-channel cells is minimized. In another preferred embodiment, the object cell may be able to be assigned other reuse units that are reserved for certain applications. When the object cell has been assigned a reuse unit, task 412 returns to the procedure requesting channel assignment.

Having thus described the present invention, it is apparent that the present invention provides a means and method whereby orbital satellite antenna cell coverage may be managed in a manner that adjacent cell interference is minimized while not allowing for excessive gaps to occur in antenna coverage regardless of the location of the satellites and cell coverage on the surface of the Earth. Satellite power is conserved and local traffic variations or other unpredictable anomalies are accommodated.

By now it should be appreciated that there has been provided a novel way for cell management of satellite cellular communication system without which the capabilities of orbiting satellites communications systems would be severely hindered.

While the invention is described in terms of specific examples and with specific preferred embodiments, it is evident that many alternatives and variations will be apparent to those skilled in the art based on the description herein, and it is intended to include such variations and alternatives in the claims that follow.

What is claimed is:

1. A method of dynamically distributing traffic load among satellite nodes in a communication system comprising the steps of:

monitoring a power consumption level of a first satellite node having a first antenna coverage pattern comprised of a first plurality of antenna beams, said first plurality of antenna beams having a first antenna beam; and communicating with a subscriber unit over a first communication channel within said first antenna beam, the communicating step contributing to said power consumption level, when the monitoring step determines that said power consumption level exceeds a predetermined level, the method further comprises the steps of:

identifying a second satellite node having a second antenna coverage pattern comprised of a second plurality of antenna beams which at least partially overlaps said first antenna coverage pattern creating an overlap region, said second plurality having a second antenna beam that at least partially overlaps said first antenna beam;

transferring communications with said subscriber unit from said first satellite node to said second satellite by switching off said first communication channel within said first antenna beam, and switching on said first communication channel in said second antenna beam; and communicating with said subscriber unit over said first communication channel within said second antenna beam after the transferring step, the communicating step contributing to a power consumption level of said second satellite node.

2. A method as claimed in claim 1 further comprising the steps of:

comprising said power consumption level of said second satellite node to said predetermined level;

performing the transferring step when said power consumption level of said second satellite node is below said predetermined level; and refraining from performing the transferring step when said power consumption level of said second satellite node is above said predetermined level.

3. A method as claimed in claim 2 wherein each antenna beam of said first plurality and each antenna beam of said second plurality has a channel set associated therewith wherein channel sets in adjacent antenna beams are non-interfering channel sets, and wherein said first antenna beam has a first channel set associated therewith and said second antenna beam has a second channel set associated therewith, and wherein said first communication channel is part of said first channel set, the method further comprising the steps of:

determining a second communication channel from said second channel set to assign to said subscriber unit;

after the communicating within said second antenna beam step, assigning said second communication channel to said subscriber unit;

directing said subscriber unit to transfer communications from said first channel to said second communication channel; and communicating with said subscriber unit on said second communication channel within said second antenna beam.

4. A method as claimed in claim 3 further comprising the step of repeating the monitoring, the identifying, the communicating, and the transferring steps for other subscriber units communicating within said first antenna beam until said power consumption level of said first satellite node falls below a second predetermined level, said second predetermined level being less than said first predetermined level.

5. A method as claimed in claim 3 further comprising the step of determining when said first antenna coverage pattern will cover a geographic area having a demand for communication services predicted to exceed exceeding a predetermined demand level, wherein said demand is created by said subscriber units located in said geographic area potentially causing said power consumption level to exceed said predetermined level, and wherein the method further comprises the transferring step when said demand for communication services is predicted to exceed said predetermined demand level.

6. A method as claimed in claim 3 further comprising the steps of:

measuring said power consumption level of said second satellite node;

identifying a third satellite node when said power consumption level of said second node exceeds said predetermined level, wherein said third satellite node has a third antenna coverage pattern comprised of a third plurality of antenna beams at least partially overlapping said first antenna coverage pattern.

7. A method as claimed in claim 6 further comprising the steps of transferring communications with said subscriber unit from said first satellite node to said third satellite node when said power consumption level of said second satellite node exceeds said predetermined level.

8. A communication system that dynamically distributes traffic load among neighboring nodes comprising:

a first node having a first antenna coverage pattern and a first set of cells associated therewith, said first set of cells including a first cell;

a second node that is moving with respect the first node and has a second antenna coverage pattern and a second set of cells associated therewith, said second set of cells partially overlapping said first set of cells creating an overlap region said second set of cells including a second cell that is overlapping said first cell; and a control facility for monitoring a power consumption level of said first node, wherein said power consumption level is determined in part by a subscriber unit communicating within said first cell on a first communication channel, Wherein the control facility includes a processor for identifying said second node when said power consumption level exceeds a predetermined level, said processor transferring communications with said subscriber unit from said first node to said second node by switching off said first communication channel within said first cell, and switching on said first communication channel in said second cell.

9. A communication system as claimed in claim 8 wherein said control facility includes:

means for comparing said power consumption level of said second node to said predetermined level;

means for performing the transferring step when said power consumption level of said second node is below said predetermined level; and means for refraining from performing the transferring step when said power consumption level of said second node is above said predetermined level.

10. A communication system as claimed in claim 9 wherein said control facility comprises means for using cell latitude and cell longitude information provided by said communication system to identify said second node, said information including locations of said first and second sets of cells for different orbital positions of said first and second nodes, and wherein each cell of said first set and each cell of said second set of cells has a channel set associated therewith wherein channel sets in adjacent cells are non-interfering channel sets, and wherein said first cell has a first channel set associated therewith and said second cell has a second channel set associated therewith, and wherein said first communication channel is part of said first channel set, and wherein the control center further includes:

means for determining a second communication channel from said second channel set to assign to said subscriber unit;

means for assigning said second communication channel to said subscriber unit after said second node communicate with said subscriber unit in said second cell; and means for directing said subscriber unit to transfer communications from said first channel to said second communication channel.

11. A communication system as claimed in claim 10 wherein said control facility further comprises means for measuring said power consumption level of said second node and means for identifying a third node when said power consumption level of said second node exceeds said predetermined level, said third node having a third antenna coverage pattern at least partially overlapping said first antenna coverage pattern, and wherein the control facility includes means for transferring communications with said subscriber unit from said first node to said third node when said power consumption level of said second node exceeds said predetermined level.

* * * * *

UNITED STATES PATENT AND TRADEMARK OFFICE
CERTIFICATE OF CORRECTION

PATENT NO. : 5,625,868
DATED : April 29, 1997
INVENTOR(S) : Yih G. Jan et al.

It is certified that error appears in the above-indentified patent and that said Letters Patent is hereby corrected as shown below:

In column 19, claim 2, line 66, delete "comprising" and insert --comparing--.

Signed and Sealed this

Twenty-sixth Day of August, 1997

Attest:

BRUCE LEHMAN

Attesting Officer

Commissioner of Patents and Trademarks